United States Patent

[11] 3,573,599

| [72] | Inventor | Robert C. Rose |
| | | Mineapolis, Minn. |
| [21] | Appl. No. | 869,671 |
| [22] | Filed | Oct. 27, 1969 |
| [45] | Patented | Apr. 6, 1971 |
| [73] | Assignee | Rosemount Engineering Company |
| | | Eden Prairie, Minn. |

[54] TWO-WIRE CURRENT TRANSMITTER WITH TRANSFORMER ISOLATION
25 Claims, 3 Drawing Figs.
[52] U.S. Cl. .................................................. 321/2, 321/16, 330/10
[51] Int. Cl. ...................................................... H02m 3/28
[50] Field of Search ............................................ 321/2, 16; 330/10

[56] References Cited
UNITED STATES PATENTS

| 2,943,256 | 6/1960 | Parker............................ | 321/16 |
| 3,258,709 | 6/1966 | Eby et al....................... | 330/10X |
| 3,439,251 | 4/1969 | Schaefer....................... | 321/2X |
| 3,445,683 | 5/1969 | Traina........................... | 330/10X |
| 3,483,476 | 12/1969 | Kobayashi et al. ......... | 330/10 |
| 3,515,974 | 6/1970 | Stich............................. | 321/2 |

Primary Examiner—William M. Shoop, Jr.
Attorney—Dugger, Peterson, Johnson & Westman ABSTRACT: A transmitter controls the flow of DC load current through two wires in accordance with the magnitude of a DC voltage representative of a variable condition. Transformer coupling is used to isolate the load side from the sensing side. This permits a thermocouple to be employed, where the variable condition is temperature, and to be freely grounded without adversely affecting the output or load current. Special DC/AC and AC/DC circuitry is included.

INVENTOR.
ROBERT C. ROSE

INVENTOR.
ROBERT C. ROSE

TWO-WIRE CURRENT TRANSMITTER WITH TRANSFORMER ISOLATION

BACKGROUND OF THE INVENTION

1. Field of the Invention

This invention relates generally to a two-wire current transmitter, especially a transmitter in which the sensing element is a thermocouple, and pertains more particularly to a transmitter utilizing transformer coupling to provide complete isolation between the circuitry directly associated with the load and the circuitry directly associated with the thermocouple.

2. Description of the Prior Art

A rather complete dissertation concerning the prior art has been presented in the Pat. application of Earl A. Grindheim, Ser. No. 732,208, filed May 27, 1968, for "Current Transmitter Responsive to a DC Isolated Voltage Signal" and assigned to the same assignee as the instant invention. The applicant does not in any way wish to disparage the invention described in said copending application.

SUMMARY OF THE INVENTION

While one object of the invention is to provide a current transmitter that has a higher frequency response with respect to producing changes in the output current signal, a more important object is to provide a transmitter possessing an exceptionally high degree of precision. More specifically, an aim of the invention is to provide a transmitter having excellent linearity characteristics, yet one which is completely isolated so that it is not vulnerable to adverse effects caused by ground connections and the various environmental currents that frequently are encountered in some types of installations. Stated somewhat differently, the invention has for an object the provision of a current transmitter in which there is no objectionable interaction between the sensing side of the circuitry and the load side thereof.

Even though transformers are employed, another object of the invention is to provide a transmitter that is very efficient, requiring only a small amount of power for its effective operation.

Still another object of the invention is to provide a transmitter that is compact, thereby encouraging its use where only a small amount of space is available.

Yet another object of the invention is to provide a transmitter that can be manufactured at a relatively low cost while retaining the desirable attributes mentioned above.

Quite briefly, the present invention is primarily concerned with a temperature-responsive bridge network in which a thermocouple is connected in series with the output of a resistance network which functions as a reference junction compensator. Only two wires are utilized which supply all the power to the transmitter and also carry the direct current representative of the variable condition being sensed. Of the three transformers providing the isolation, one operates in series with the current source and functions chiefly as a DC/DC converter. A second of the three transformers provides a feedback signal derived from the load current flowing through the two wires. The third transformer is an output coupling transformer, coupling the carrier amplifier to a demodulator which in turn controls a DC amplifier that is in parallel with the constant current source supplying the DC/DC converter transformer. Consequently, where a thermocouple is employed as the sensing element, it can become grounded without disturbing the normal current paths. Hence, the transmitter can be installed in various industrial environments, even though relatively high voltages may be encountered.

Accordingly, it is contemplated that the invention will find especial utility in industrial plants where large ground currents flow through portions of the plant's structure and where fast thermal response dictates that the thermocouple be connected directly to the metallic structure. The transmitter hereinafter described is capable of withstanding voltages considerably higher than those which would be associated with such ground currents, since they involve only small voltages that could be injected into the sensing portion of the transmitter. Thus, while the ground currents may be several hundred, or even thousands of, amperes, the accompanying voltages will usually not be over 5 volts or so. As indicated above, the present invention is intended to withstand voltages of a much higher order than those apt to be found in the customary industrial environment.

DESCRIPTION OF THE PREFERRED EMBODIMENT

Figure 1A:
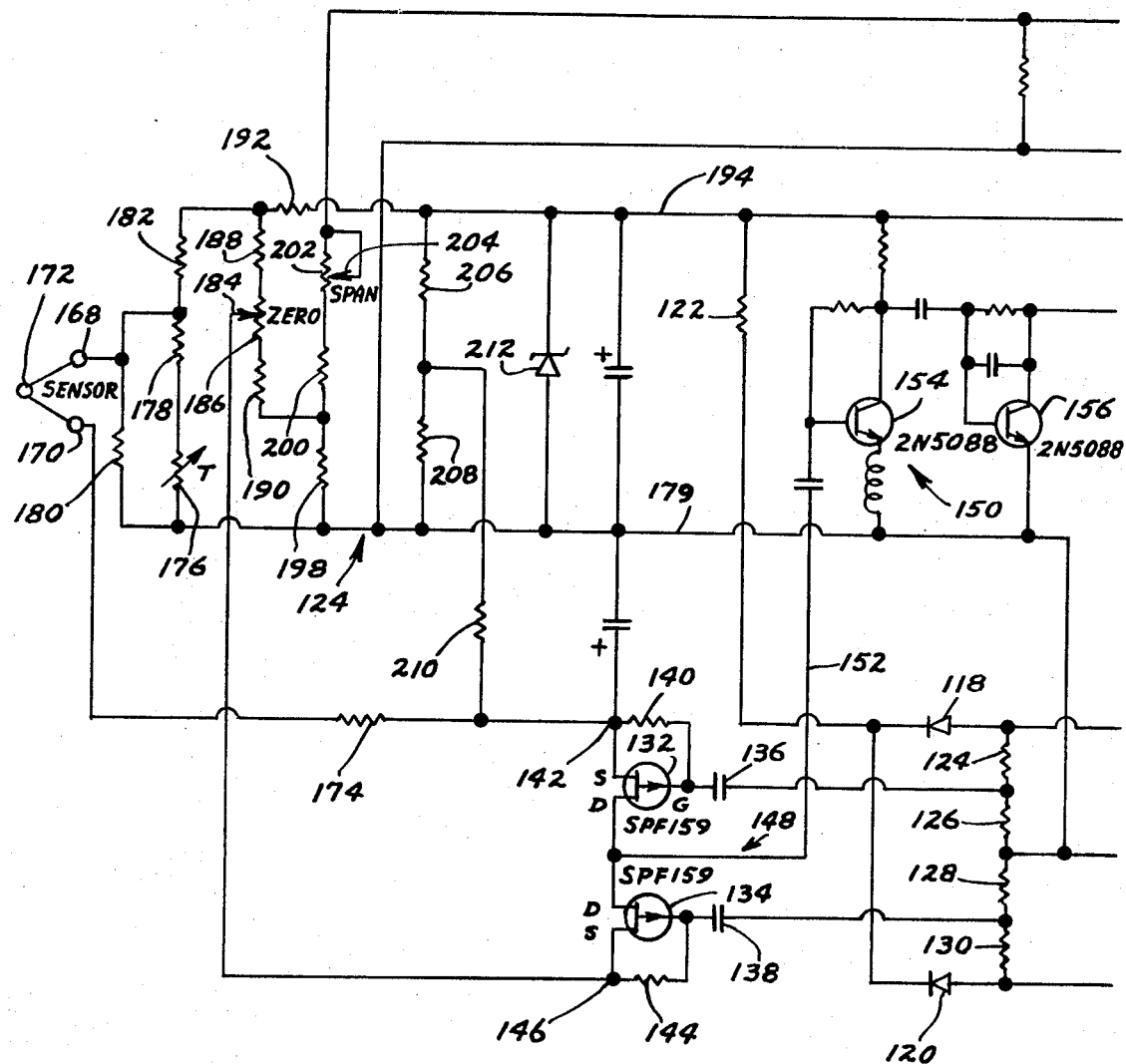
FIGS. 1A, 1B and 1C when placed side by side constitute a schematic diagram exemplifying the present invention.
Figure 1B:
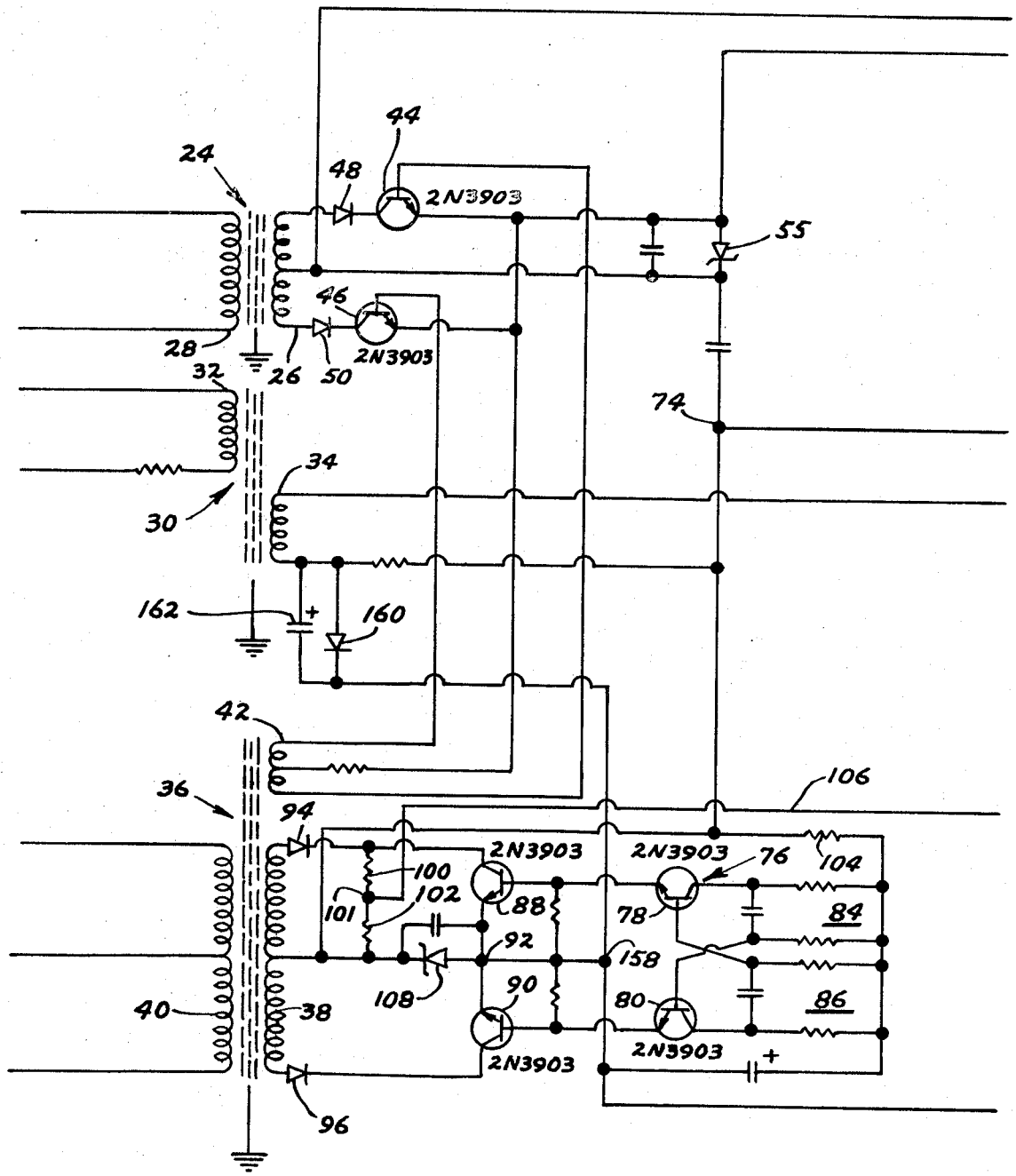
Figure 1C:
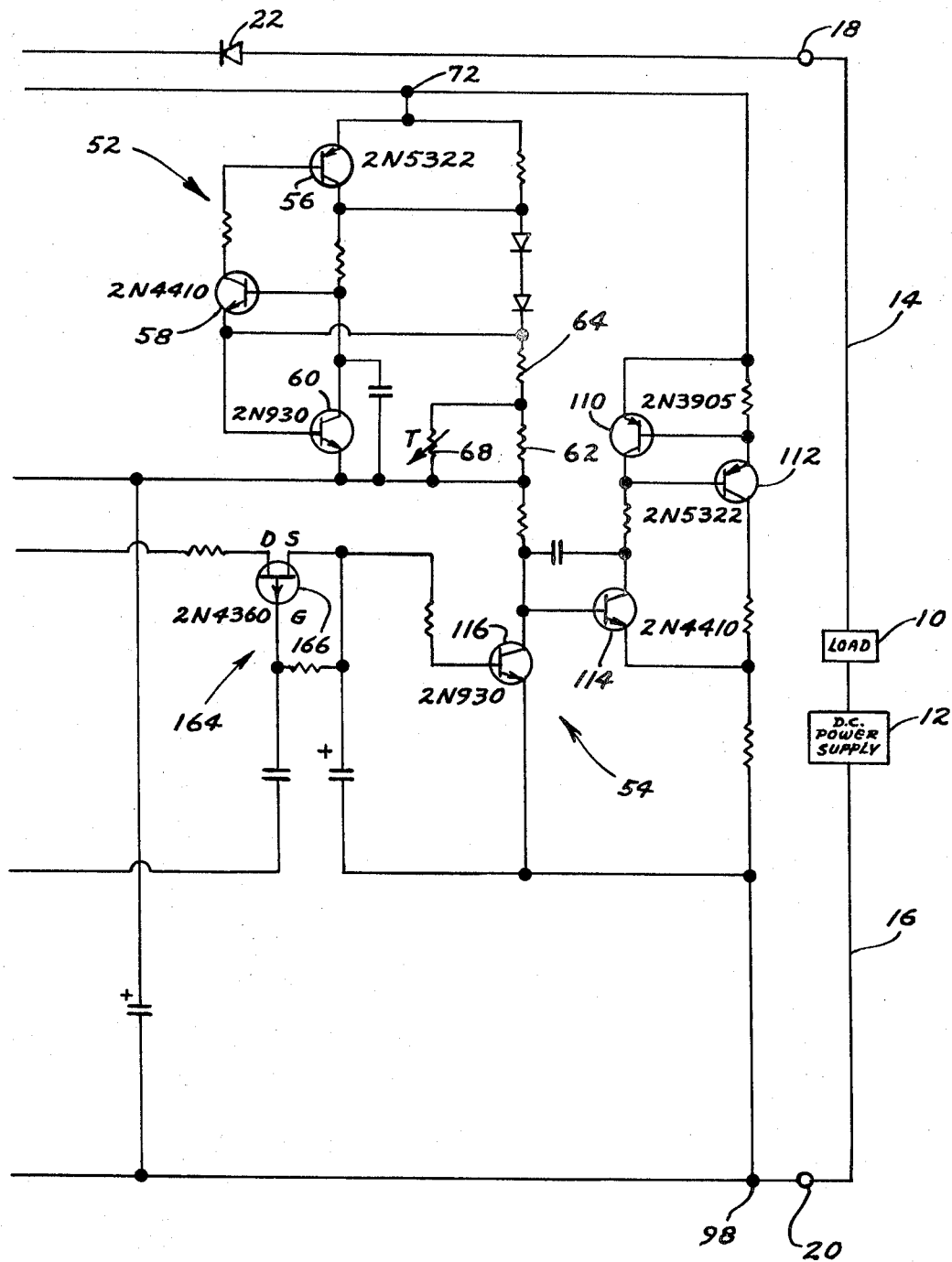

With reference to the drawing, it is to be noted that a load, which may be a milliammeter, a recorder, a controller, or any other utilization device, has been designated by the reference numeral 10. In series with the load 10 is a direct current power supply 12 providing all of the power required by the circuitry constituting the transmitter. A single pair of wires 14, 16 furnish both the power to the transmitter and carry the signal current that is representative of the magnitude of a variable condition. It is contemplated that the variable condition will be a thermal one in which an accurate transmission of a signal in accordance with the temperature sensed by the thermocouple will be involved, but it can also be a variable millivolt signal. It will be recognized that the two wires 14, 16 may be of any desired length and this enables the transmission of the signal from a remote location, frequently inaccessible, to a point where it can be properly monitored. Irrespective of the length of the wires 14, 16 they extend to a pair of terminals 18, 20. Thus, the circuitry contained between the terminals 18, 20 represents the transmitter itself. To provide protection against a reverse polarity connection of the power supply 12, a diode 22 has its anode connected directly to the terminal 18.

The first transformer 24 to be referred to has a primary winding 26 provided with a center tap to which the cathode of the diode 22 is connected and a secondary winding 28. More specifically, the transformer 24 is connected so as to feed back a signal derived from the load current. This function will be better understood as the description progresses.

A second transformer 30 has a primary winding 32 and a secondary winding 34. In this instance, it operates as an output coupling transformer, taking an amplified alternating current signal and inductively transferring it from its primary winding 32 to its secondary winding 34.

Another transformer 36, which functions as a DC/DC converter, is incorporated into the transmitter having a center-tapped primary winding 38, a first secondary winding 40, and an auxiliary secondary winding 42 connected in circuit to the primary winding 26 of the feedback transformer 24. All three windings 38, 40 and 42 of the transformer 36 are center tapped.

By depicting the transformers 24, 32 and 36 in a stacked or vertically arrayed relationship in the drawing, it is thought that it will be more readily seen that a so-called vertical cleavage exists between the left and right sides of these three transformers, the circuitry at the left thereby being completely isolated from the circuitry at the right.

It has hereinbefore been stated that the secondary winding 42 of the transformer 36 is connected in circuit with the primary winding 26 of the transformer 24. More specifically, the ends of the secondary winding 42 are connected to the bases of a pair of driver transistors 44, 46. A diode 48 is connected in the collector-emitter path of the transistor 44 and similarly a diode 50 is contained in the corresponding path through the transistor 46, the diodes 48, 50 thus being in series with the primary winding 26 of the feedback transformer 24. The inclusion of the diodes 48, 50 eliminates certain objectionable waveforms. In this regard, when, say, the transistor 44 is conducting and thus driving the core of the transformer 24 and the other transistor 46 is switched on instead, the power being dissipated in the secondary winding 28 of the feedback transformer 24 can cause a negative voltage to be applied to the transistor 46. This action has produced leakage current that in turn resulted in large errors in the load current which cannot be tolerated since the load current, as will later be manifest, must truly represent the value of the measurand or variable condition. The diodes 48, 50, therefore, block such leakage current and a good waveform is assured.

The current initially, that is when the transmitter is first energized, cannot flow in the opposite direction through the legs of the primary winding 26 of the transformer 24 because the driver transistors 44 and 46 are not at this time able to conduct. In order to forward supply current to the constant current source designated generally by the reference numeral 52 and also to the output amplifier denoted by the numeral 54, there is a Zener diode 55 connected between the emitter of the transistor 44 and the center tap of the primary winding 26 of the transformer 24. When voltage is initially applied, the Zener diode 55, which should be rated at about 6 volts, conducts so as to forward current initially to the constant current source 52 and the output amplifier 54.

The constant current source 52 includes three transistors 56, 58 and 60, the first being of PNP conductivity and the other NPN types. The current source 52 is both voltage-stabilized and temperature-compensated so as to accurately regulate the current therethrough. The thermal correction is provided by a temperature-compensated resistance network composed of resistors 62 and 64, the resistor 62 having a thermistor 68 in shunt therewith.

For convenience of description the input to the constant current source 52 from the power supply 12 is through a junction 72. The output from the constant current source 52 flows through a junction labeled 74, the output still being direct current. However, for the transformer 24 to transfer power from its primary winding 26 to its secondary winding 28, it is necessary to convert the direct current to alternating current. This is done by a multivibrator 76 comprising transistors 78 and 80. The bases of the transistors 78 and 80 are interconnected by resistive-capacitive networks 84 and 86, the multivibrator functioning in conventional fashion to convert the output current from the current source 52 to an alternating or pulsating one.

However, the multivibrator 76 does not feed directly into a transformer. Instead, a pair of driver transistors 88 and 90 are turned on and off by the multivibrator transistors 78 and 80. More specifically, it will be discerned that the emitters of the transistors 78, 80 are connected directly to the bases of the transistors 88, 90. The emitters of the driver transistors 88 and 90 are tied together at a junction 92. The collectors of the transistors 88, 90 are connected directly to the cathodes of diodes 94, 96 and the anodes of these two diodes are connected to the opposite ends of the primary winding 38.

It is to be noted that the output side of the constant current source 52, that is, the junction 74, is also connected to the center tap of the primary winding 38 belonging to the DC/DC transformer 36. Hence, when the driver transistors 88, 90 become alternately conductive due to the biasing action supplied via the multivibrator transistors 78 and 80, by reason of the emitters of the transistors 88 and 90 being connected to a common circuit, there is a flow of current through the legs of the transformer winding 38, more specifically the winding portions above and below the center tap. This causes the current to combine with the current from the DC output amplifier 54 at junction 98. The combined current, which constitutes the load current, then flows to the terminal 20.

Attention is directed for a moment to a voltage divider composed of resistors 100 and 102. These resistors 100, 102 are connected between the cathode of the diode 94 and the center tap of the winding 38. The center tap of the winding 38, in addition to being connected to the junction 74 (located at the output side of the constant current source 52) is connected through a resistor 104 to the various resistors contained in the coupling networks 84, 86 of the multivibrator 76. The junction 101 between the resistors 100, 102 constituting the voltage divider is used for synchronizing the rectifying action performed by a demodulator hereinafter described, a conductor 106 providing such connection. A Zener diode 108 provides a bypass function during the turn on period, acting in the same manner as the earlier-mentioned Zener diode 55.

A second circuit is connected in parallel with the circuit which includes the constant current source 52 and the multivibrator 76, this second circuit including the direct-current amplifier 54 comprised of transistors 110, 112, 114 and 116. It should be adequate to merely state that the amplifier 54 contained in the second circuit amplifies a direct-current signal derived from the sensing side (that is to the left of the transformers 24, 30 and 36 yet to be described) of the transmitter. However, inasmuch as the two circuits are connected in parallel (between the junctions 72 and 98) with each other and in series with the wires 14 and 16, the current flowing through the two circuits first divides at the junction 72 and recombines at the junction 98, the recombined current, which is actually the load current flowing through the terminal 20, the load 10 and the power supply 12.

The secondary winding 40 belonging to the transformer 36 is connected to a pair of diodes 118 and 120. In this way, the secondary current from the transformer 36 is rectified and supplied through a resistor 122 to a resistance bridge circuit that is temperature sensitive, the bridge circuit being designated in its entirety by the reference numeral 124. It is to be observed that the secondary voltage supplied by the transformer 36 is also impressed on a voltage divider composed of resistors 124, 126, 128 and 130, and that the junctions of resistors 124, 126 and 128, 130 connect to the gates of two field effect transistors 132 and 134 through coupling capacitors 136 and 138, respectively. A large value resistor 140 connects between the gate of the transistor 132 to its source via a junction denoted by the numeral 142. Similarly, the transistor 134 has a resistor 144 connected between its gate and source by way of a junction labeled 146. The transistors 132, 134, together with the resistors and capacitors associated therewith, function as a chopper 148 that supplies alternating current to a carrier amplifier 150 by way of a conductor 152 extending between the common or tied together drains of the two transistors 132 and 134 to the base of a transistor 154 constituting the first stage of the carrier amplifier 150. The second stage includes a transistor 156. The output from the carrier amplifier 150 is impressed upon the primary winding 32 of the output coupling transformer 30.

The secondary winding 34 of the transformer 30 has one end connected to a junction 158 (which in turn is connected to the junctions 92 and 98) through a diode 160 shunted by a bypass capacitor 162 and its other end connected to a demodulator 164 utilizing a field effect transistor 166. It will be seen that the gate of the transistor 166 is connected to the center junction 101 of the voltage divider 100, 102. Thus, the connection from the junction 101 of the voltage divider 100, 102 provides a synchronization to the demodulator 164 so that it will be coincidentally gated on and off with the multivibrator 76 supplying AC power to the transformer 36.

Describing now the temperature-responsive bridge network 124, a pair of terminals 168, 170 are provided across which a sensor in the form of a thermocouple 172 is connected, since the variable condition to be measured will be considered to be of a thermal character. The terminal 170 is connected through a resistor 174 to the junction 142, this junction 142 being connected to the source of the field effect transistor 132 belonging to the chopper 148.

Cold junction compensation is included in the network 124. To provide this compensation, a nickel resistance element 176, which varies with temperature, has one end connected via a conductor 179 to the center tap of the secondary winding 40 of the transformer 36 which serves as the common point for all circuitry on the left side. The other end of the nickel resistance element 176 is attached to one end of a fixed resistor 178, the function of the resistor 178 merely being to give a higher base voltage with which to work since the current flowing through the element 176 is quite small. A resistor 180 shunts the combination labeled 176, 178, the terminal 168 being electrically connected to the point where the resistors 178, 180 are joined. Still another resistor, this being resistor 182 is included and one end thereof is connected to the resistor 178.

Whereas the terminal 170 is electrically connected to the source of the field effect transistor 132 of the chopper 148, this being through the resistor 174 and junction 142, it will be observed that the source of the second field effect transistor 134 of the chopper 148 is connected to the wiper arm 184 of a zero potentiometer 186. The potentiometer 186, as will presently be seen, introduces a fixed DC voltage (although adjustable) that offsets the net voltage of the bridge network 124, thereby forcing the thermocouple 172 to sense a higher temperature before a null condition is achieved. Accordingly, the potentiometer 186 is in series with a resistor 188 and a resistor 190. The resistor 188 is connected through a resistor 192 to a conductor 194. In this way, the direct-current level is established by the particular setting of the wiper arm 184 to provide the appropriate offsetting DC voltage mentioned above. Resistor 190 is connected through a resistor 198 to the common line 179. It will be noted that the junction of the resistors 190, 198 is connected to a resistor 200 which in turn is connected to a span potentiometer 202 having a wiper arm 204 connected directly to one end of the secondary winding 28 of the feedback transformer 24.

Several additional resistors 206, 208 and 210 are employed. In this regard, the junction of the resistors 206 and 208 is connected to one end of the resistor 210, the other end of the resistor 210 being connected to the junction 142 and hence to the source of the field effect transistor 132 of the chopper 148. The purpose of the resistors 206, 208 and 210 (and also 174) is to provide either upscale or downscale burnout protection should the thermocouple 172 open or become detached from the terminals 168, 170. Sometimes in very high temperature service, the thermocouple can burn out and under such a condition there would be no information whatsoever getting to the direct-current amplifier 54. This would have the effect of permitting the signal to wander aimlessly and the output current, that is the load current flowing through the wires 14 and 16, to reach virtually any value. The value would be indeterminate. This is a very bad situation in a process, say, where heat is being delivered to the process and the thermocouple is relied upon to provide a signal that would call for a lower amount of heat. Without the thermocouple providing the proper signal, the load current could fall to an extremely low level and indicate, although erroneously, that more and more heat should be supplied and this could quickly become disastrous. Consequently, there is a voltage derived from the junction of the resistors 206, 208 that is carried over to the input via the resistor 210 that precludes this adverse condition from occurring. In other words, if the thermocouple 172 should burn out, the signal immediately drops or rises as required to protect the system. To provide the requisite voltage stabilization for the network 124, a Zener diode 212 is connected between the conductors 178 and 194.

Having given the foregoing description, it is believed readily apparent that isolation is needed because without it should the thermocouple 172 become grounded, the normal paths of current flow would be grossly disturbed. Actually, the ability of the transmitter to function properly would be completely destroyed. With the transmitter that is herein described, voltages up to even 115 volts can be applied to the thermocouple 172 without disturbing the readings obtained at the load 10. As far as the thermocouple side is concerned, the thermocouple 172 can be bonded directly to the hot spot, say the side of the pressure vessel itself or the pipe carrying the high temperature media, without any adverse effect whatsoever. Even should the thermocouple 172 be subjected to 60-cycle modulation, the accuracy of the DC load current will not be interfered with.

At least portions of the operational description should be readily apparent from the description already given. Initially, it will be recognized that the transistors 44, 46 will be nonconducting. It is only when a sufficient voltage has been applied across the Zener diode 55, that there will be a flow of current to the junction 72. The current at the junction 72 separates, one portion thereof flowing to the constant current source 52 and the other through the direct-current amplifier 54. The current from the source 52, which is both voltage and temperature stabilized, is then directed through the junction 74 to the multivibrator 76. The multivibrator 76 causes the driver transistors 88 and 90 to furnish alternating current to the primary winding 38 of the DC/DC converter transformer 36.

The secondary winding 40 of the transformer 36 feeds into the chopper 148 via the voltage divider which includes the resistors 126 and 128. As previously stated, the zero potentiometer 186, more specifically its wiper arm 184, is connected to the source side of the field effect transistor 138 of the chopper 148. Hence, the potentiometer 186 establishes a direct-current level for the transistor 134. On the other hand, the source side of the field effect transistor 132 is representative of the dependent variable signal which varies with respect to the signal at the source of the field effect transistor 134 depending upon the millivoltage provided by the thermocouple 172, the voltage of the thermocouple in turn depending upon the amount of heat to which it is subjected.

Attention is directed to the fact that there is no rectification of the output from the secondary winding 28 of the feedback transformer 24. There is no need for rectification, because the AC signal can be injected back into the bridge network 124 as a feedback signal. This, in effect, adds an alternating current component to the more basic direct-current component introduced at the zero potentiometer 186, the alternating current component being superimposed thereon via the span potentiometer 202 and the resistor 200, the connection between the resistors 190, 198 and 200 enabling this to be accomplished. Once again, it should be distinctly noted, though, that there is no need for rectifying the feedback signal as forwarded from the secondary winding 28 of the feedback transformer 24, this being because the feedback action is achieved synchronously.

The offset voltage that has been referred to plus the feedback voltage is compared with the voltage provided by the thermocouple 172. If the two agree, then there would be no difference present and the amplifier 150 would not have to provide any corrective action. However, they will always disagree slightly and in actual practice this is essential. Consequently, the carrier amplifier 150 sends a signal through the primary winding 32 of the coupling transformer 30, the secondary winding 34 therefore reflecting the magnitude of this signal so that after demodulation by the demodulator 164 there is a control signal forwarded to the direct-current amplifier 54 that results in a value change being made to the output of the amplifier 54. The auxiliary secondary winding 42 of the transformer 36 is connected so as to drive transistors 44 and 46 into alternate switching action.

The total amount of current flowing through the wires 14 and 16, and through the terminals 18 and 20 to the load 10 will represent the amount of variation determined by the thermocouple 172. If the thermocouple 172 senses a relatively low temperature, then the current through the load 10 will be smaller and vice versa so that the load current is indicative of the magnitude of the variable condition.

I claim:

1. A current transmitter for connection to a pair of wires having a load and a direct-current power supply in series therewith comprising an impedance network responsive to a variable condition for providing a direct-current voltage representative of the magnitude of said condition, means for deriving an alternating current signal from said direct-current signal which is representative of the magnitude of said direct-current signal, direct-current circuit means connected in series with said pair of wires including an amplifier for controlling a portion of the current flowing through said direct-current circuit means, means connected to said direct-current circuit means for converting a second portion of the current flowing through said direct-current circuit means to alternating current, transformer means connected to said alternating current converting means and to said alternating current deriving means, rectifier means connected between said transformer means and said network and between said alternating current deriving means for supplying direct-current energization to said network and to said alternating current deriving means, and demodulating means associated with said transformer means and said amplifier for controlling said amplifier in accordance with the current from said transformer means.

2. A current transmitter for connection to a pair of wires having a load and a power supply in series therewith comprising a first circuit providing a first direct-current path, a second circuit in parallel with said first circuit providing a variable direct-current path, said first and second circuits being in series with said pair of wires, means in said first circuit for deriving an alternating current from the direct-current flowing through said first circuit, a first transformer having primary and secondary windings, said primary winding being connected to said means for deriving an alternating current, rectifying means connected to the secondary winding of said first transformer, means energized by said rectifying means providing a direct-current voltage signal representative of the magnitude of a variable condition, chopper means connected to said last-mentioned means for changing said direct-current voltage signal to an alternating current signal, means for amplifying said alternating current signal, a second transformer having primary and secondary windings, the primary winding of said second transformer being connected to said amplifying means, demodulating means connected to the secondary winding of said second transformer for controlling said second circuit to vary the amount of direct-current flowing therethrough in accordance with the magnitude of the signal provided by said demodulating means.

3. The transmitter defined in claim 2 in which said first circuit includes means for providing a substantially constant direct-current source.

4. The transmitter defined in claim 2 in which said second circuit includes an amplifier controlled by said demodulating means.

5. The transmitter defined in claim 4 in which said demodulating means is connected to said alternating current deriving means so that the rectifying periods of said demodulating means are in a timed relation with the derived alternating current.

6. The transmitter defined in claim 2 in which said means providing a direct-current voltage signal representative of a variable condition includes a temperature-responsive bridge network and said transmitter further including rectifying means for energizing said bridge network.

7. The transmitter defined in claim 2 including a third transformer having primary and secondary windings, and circuit means in series with said wires and said first and second circuits for deriving an alternating current in accordance with the load current flowing through said wires and supplying such current to the primary of said third transformer, the secondary of said third transformer being connected to said means for providing a direct-current voltage signal representative of the magnitude of a variable condition so that at least a portion of the alternating current derived from said load current is impressed on the direct-current voltage signal representative of the magnitude of said variable condition.

8. The transmitter defined in claim 7 in which said first transformer includes an auxiliary secondary winding connected to the primary winding of said third transformer so that the alternating current delivered to the primary winding of said third transformer is in phase with the alternating current derived from the direct current flowing through said first circuit.

9. A current transmitter for connection to a pair of wires having a direct-current power supply and a load in series therewith comprising a DC/DC converter transformer having a primary winding and first and second secondary windings, constant current source means providing a first circuit through which a regulated portion of the load current flows, output amplifier means connected in parallel with said first circuit to provide a second circuit through which a second portion of the load current flows, said first and second circuits being connected in series with said pair of wires, a feedback transformer having primary and secondary windings, the primary winding of said feedback transformer being supplied with power from the first secondary winding of said DC/DC transformer, multivibrator means connected to said constant current source means and to the primary winding of said DC/DC transformer for changing the current from said constant current source means to an alternating current for supplying the primary winding of said DC/DC transformer, rectifier means connected to the second secondary winding of said DC/DC transformer, a temperature-sensitive bridge means connected to said rectifier means, said bridge means including a temperature-sensitive element, chopper means also connected to said rectifier means, said chopper means including a pair of field effect transistors, one gate of one transistor being connected to said bridge means so as to provide a reference level of voltage and the other transistor having its gate connected to the temperature-sensitive element of said bridge means so as to superimpose an alternating current signal voltage on said reference voltage, the secondary winding of said feedback transformer being connected to said bridge so as to provide an alternating current in accordance with the load current, an alternating current carrier amplifier, the connected portions of said field effect transistors being connected to said carrier amplifier, an output transformer having primary and secondary windings, the output of said carrier amplifier being supplied to the primary winding of said output transformer, and a demodulator connected between the secondary winding of said output transformer and said output amplifier so as to control said amplifier in accordance with the magnitude of the demodulated signal, whereby the load current flowing through said pair of wires and said load is representative of the temperature being sensed by said temperature-sensitive device.

10. A current transmitter for connection to a pair of wires having a load and direct-current power supply in series therewith comprising means for converting a portion of the direct current that flows through said load to alternating current, a chopper controlled by said alternating current means including first and second switch means that are alternately closed and opened by said alternating current means, sensing means connected in circuit with said first switch means for supplying a direct-current signal representative of the magnitude of a variable condition, a first transformer having a primary winding connected to said alternating current means and a secondary winding connected in circuit with said second switch means for providing a feedback signal representative of the magnitude of said converted alternating current, a second transformer having a primary winding connected to the juncture of said first and second switch means of said chopper and having a secondary winding, and means connected to the secondary winding of said second transformer for converting the alternating current provided by said last-mentioned secondary winding to direct current to increase or decrease the direct current that flows through said load, said last-mentioned means also being controlled by said alternating current means so that said last-mentioned means and chopper are operated in synchronism.

11. The transmitter defined in claim 10 in which said alternating current means includes a multivibrator and a third transformer having a primary winding connected to said multivibrator and having a pair of secondary windings, one of said pair of secondary windings being connected to said chopper for controlling same to alternately open and close said first and second switch means and the other of said pair of secondary windings being connected to the primary winding of said first transformer.

12. The transmitter defined in claim 11 including a carrier amplifier connected between the juncture of the two switch means and the secondary winding of said second transformer.

13. The transmitter defined in claim 12 in which said means for converting alternating current to direct current includes a demodulator controlled by said multivibrator.

14. The transmitter defined in claim 13 including a direct-current amplifier for connection in circuit with said pair of wires so that at least a portion of the direct current that flows through the load is amplified thereby, said direct-current amplifier being controlled by said demodulator.

15. The transmitter defined in claim 14 including current-regulating means connected in parallel with said direct-current amplifier for supplying direct current to said multivibrator, the entire load current flowing through said direct-current amplifier and said current-regulating means.

16. The transmitter defined in claim 10 including a resistance network connected between the secondary winding of said first transformer and said chopper and in which said sensing means is connected for supplying said variable condition signal to said first switch means and for supplying said feedback signal to said second switch means.

17. The transmitter defined in claim 16 in which said network includes means for adding an offset signal to said feedback signal.

18. The transmitter defined in claim 17 including rectifier means connected between said alternating current means and said resistance network for energizing said network with direct current.

19. A current transmitter for connection to a pair of wires having a load and direct-current power supply in series therewith comprising an impedance network means responsive to a variable condition for providing a direct-current voltage representative of the magnitude of said condition, means for converting a portion of the current that flows through the load to alternating current, transformer means for feeding a proportional amount of said alternating current to said network means as a feedback signal, output transformer means, means for alternately connecting said output transformer means to one portion of said network means so that said output transformer means passes a current representative of the magnitude of said variable condition during one period and then connecting said output transformer means to a second portion of said output transformer means so that said output transformer means passes a current representative of the magnitude of said feedback signal during a successive period, and means connected to said output transformer means and said converting means for synchronously converting a portion of the current passed by said output transformer means to direct current, and means connecting said second converting means in circuit with said load so as to increase or decrease the flow of direct current through said load so that the load current is indicative of the magnitude of said variable condition.

20. The transmitter defined in claim 19 in which said last-mentioned means includes direct-current amplifier means.

21. The transmitter defined in claim 20 including current-regulating means in parallel with said direct-current amplifier means, said first-mentioned converting means being connected to said regulating means so as to be energized thereby.

22. The transmitter defined in claim 21 in which said first-mentioned converting means includes a multivibrator means connected to said regulating means and a transformer means connected between said multivibrator means and said alternately connecting means.

23. The transmitter defined in claim 22 including rectifier means connected between said last-mentioned transformer means and said network means for supplying direct current to said network means.

24. A current transmitter for connection to a pair of wires having a load and a direct-current power supply in series therewith comprising means for providing a direct-current signal representative of the magnitude of a variable condition, means for providing an alternating current signal representative of the magnitude of direct current that flows through said load, transformer means, chopper means operable in synchronism with said alternating current providing means for alternately supplying said direct current and alternating current signals to the input of said transformer means, means operable in synchronism with said alternating current providing means for rectifying the alternating current from the output of said transformer means, and means controlled by said rectifying means for changing the value of the direct current that flows through said load, whereby said load current is indicative of the magnitude of said variable condition.

25. The transmitter defined in claim 24 in which said alternating current providing means includes first and second transformers, the input of said first transformer being connected to said multivibrator and having its output connected to said chopper means and to the input of said second transformer so that the output of said second transformer provides said alternating current signal that is representative of the direct current that flows through said load.